United States Patent
Brandt et al.

(10) Patent No.: US 9,166,236 B2
(45) Date of Patent: Oct. 20, 2015

(54) ELECTROCHEMICAL CELL

(75) Inventors: Torsten Brandt, Forchheim (DE); Joachim Hoffmann, Burgthann (DE); Arno Mattejat, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 26 days.

(21) Appl. No.: 14/006,739

(22) PCT Filed: Mar. 6, 2012

(86) PCT No.: PCT/EP2012/053791
§ 371 (c)(1),
(2), (4) Date: Sep. 23, 2013

(87) PCT Pub. No.: WO2012/126719
PCT Pub. Date: Sep. 27, 2012

(65) Prior Publication Data
US 2014/0017600 A1 Jan. 16, 2014

(30) Foreign Application Priority Data

Mar. 23, 2011 (EP) .................... 11159359

(51) Int. Cl.
*H01M 8/04* (2006.01)
*C25B 15/08* (2006.01)
*H01M 8/02* (2006.01)

(52) U.S. Cl.
CPC ........... *H01M 8/04201* (2013.01); *C25B 15/08* (2013.01); *H01M 8/0247* (2013.01); *H01M 8/0258* (2013.01); *H01M 8/0252* (2013.01); *H01M 8/0263* (2013.01); *Y02E 60/50* (2013.01)

(58) Field of Classification Search
CPC .. C25B 15/08; H01M 8/0247; H01M 8/0258; H01M 8/04201; H01M 8/0252; H01M 8/0263; Y02E 60/50
USPC .......... 429/447, 455, 456, 457, 458, 513, 514
See application file for complete search history.

(56) References Cited

U.S. PATENT DOCUMENTS 7,022,430 B2 4/2006 Enjoji et al.
8,338,048 B2 12/2012 Mattejat et al.
(Continued)

FOREIGN PATENT DOCUMENTS

| DE | 10300068 A1 | 8/2003 |
| EP | 1970985 A1 | 9/2008 |
| WO | 2004049483 A2 | 6/2004 |
| WO | 2009157981 A1 | 12/2009 |

OTHER PUBLICATIONS

"Elektrochemische Zelle", Wikipedia, http://de.wikipedia.org/wiki/Elektrochemische_Zelle, p. 1; Feb. 18, 2011.
"Brennstoffzelle", Wikipedia, http://de.wikipedia.org/wiki/Brennstoffzelle, pp. 1-8; Mar. 18, 2011.

*Primary Examiner* — Patrick Ryan
*Assistant Examiner* — Ben Lewis
(74) *Attorney, Agent, or Firm* — Laurence A. Greenberg; Werner H. Stemer; Ralph E. Locher

(57) ABSTRACT

An electrochemical cell includes a flow chamber disposed between two plate elements and having a flow inlet and a flow outlet for a flow medium permeating the flow chamber and defining a main flow direction of the flow medium between the flow inlet and the flow outlet. One of the plate elements has protrusions for supporting the plate element on the other plate element in a regular grid structure, between which a network of flow channels passing through the flow chamber runs in at least one flow channel direction. The regular grid structure is configured in such a way that the grid of the flow channels has two or more flow channel directions each enclosing an angle differing from zero degrees relative to the main flow direction of the flow medium.

5 Claims, 2 Drawing Sheets

(56) References Cited

U.S. PATENT DOCUMENTS

| | | |
|---|---|---|
| 2003/0129475 A1 | 7/2003 | Enjoji et al. |
| 2004/0131915 A1 | 7/2004 | Sherman et al. |
| 2010/0009233 A1 | 1/2010 | Blanchet et al. |
| 2010/0104922 A1* | 4/2010 | Mattejat et al. .............. 429/34 |

* cited by examiner

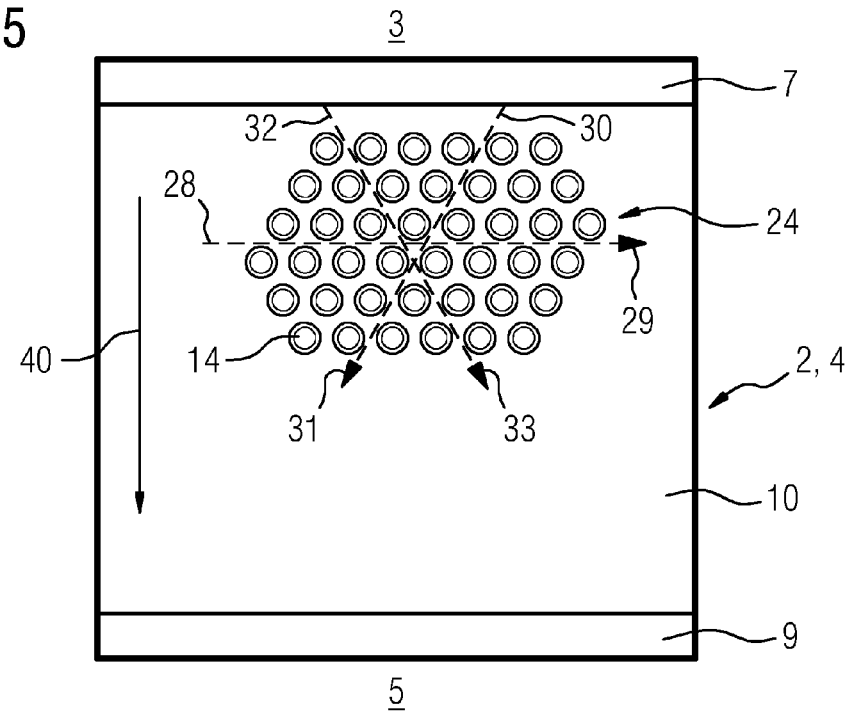
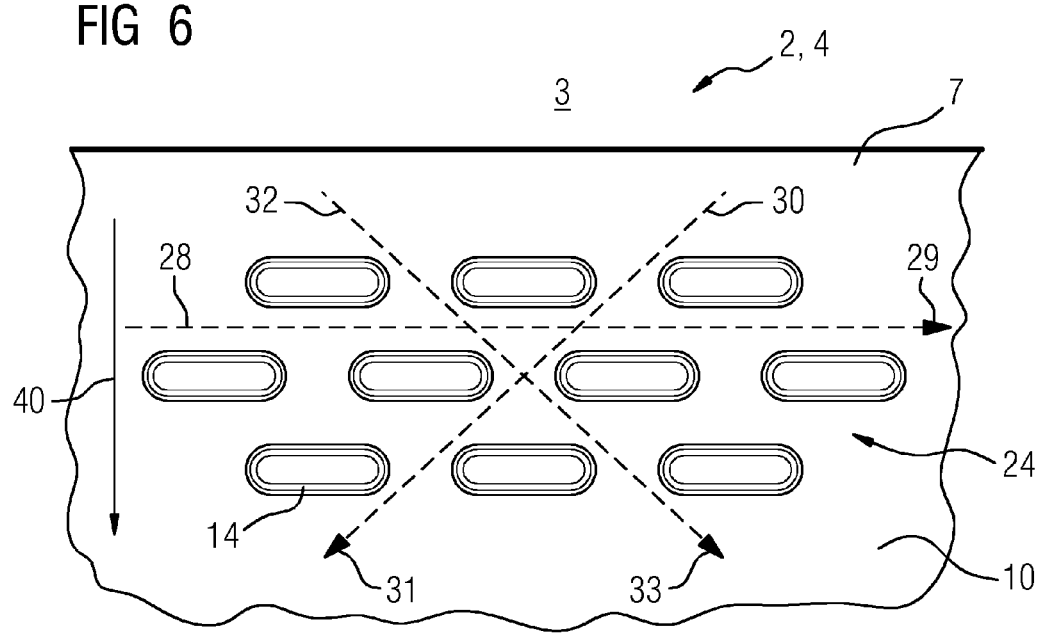

ELECTROCHEMICAL CELL

BACKGROUND OF THE INVENTION

Field of the Invention

The invention relates to an electrochemical cell comprising a flow chamber arranged between two plate elements and having a flow inlet and a flow outlet for a flow medium permeating the flow chamber, wherein a main flow direction of the flow medium is created between the flow inlet and the flow outlet and wherein one of the plate elements has protrusions for supporting the plate element on the other plate element in a regular grid structure, between which a network of flow channels arranged through the flow chamber extends in at least one flow channel direction.

Electrochemical cells are generally known, for example from http://de.wikipedia.org/wiki/Elektrochemische_Zelle (Oct. 25, 2010), and are subdivided into galvanic cells and electrolytic cells.

An electrolytic cell is a device in which an electric current forces a chemical reaction to take place wherein, at least part of the electrical energy is converted into chemical energy. A galvanic cell is a device—which is complementary to an electrolytic cell—for the spontaneous conversion of chemical energy into electrical energy. A known device of a galvanic cell of this type is a fuel cell, for example, a PEM fuel cell (Proton Exchange Membrane fuel cell or Polymer Electrolyte Membrane fuel cell) (http://de.wikipedia.org/wiki/Brennstoffzelle, Oct. 25, 2010).

In a fuel cell, hydrogen (H2) and oxygen (O2) react at an electrolyte, giving off heat, and produce electrical energy and water which, together with the condensed-out moisture, must be removed from the fuel cell. This is achieved by driving the water out of the fuel cell with excess fuel gas, for which reason, more fuel gas is fed in than is required for the reaction.

An active membrane and the electrodes surrounding said membrane of a PEM fuel cell must be supplied evenly on both the anode side and the cathode side with fuel gases in order to obtain the most even possible cell activity over the entire active area. At high power densities, locally uneven activity can lead to locally raised temperatures and possible damage to the membrane and the electrodes.

The entry and exit into or the throughflow of the two fuel gases through a fuel cell is achieved with discrete channels, the geometry and position of which relative to the active areas cannot always be optimally configured due to the design framework conditions. The result is the formation in the two gas chambers of the fuel cell of regions where the flow readily occurs and where the water removal readily occurs, and other regions where "flow shadows" form where the flow is only weak and the water is not satisfactorily conducted away. In unfavorable cases, water droplets which become lodged lead to blockage of the cell function in such flow shadows.

In fuel cells which are operated with fuel gases having inert components, such as reformer gas or air, inert gas cushions form in the regions of poor flow, reducing the efficiency of the active components locally in such regions. The fuel cell is operated in such regions with a gas which has a low useful gas concentration.

DE 103 00 068 A1 discloses a fuel cell wherein the gas chambers are provided with elongate gas conducting elements. Said elements conduct the fuel gases from a gas inlet to a gas outlet of the gas chambers in such a way that they flow, in particular, through the otherwise poorly perfused regions.

EP 1 970 985 A1 discloses a fuel cell wherein a gas chamber has a network of flow channels formed by protrusions arranged in a grid structure which are perfused by a flow medium, a fuel gas. According to EP 1 970 985 A1, by variation of flow cross-sections of the flow channels, the perfusion of the gas chamber with the flow medium can be influenced and steered.

WO 2009/157981 A1 discloses a fuel cell wherein a gas chamber comprises flow channels formed by protrusions, said protrusions being arranged in the flow direction or transversely to a flow direction of a flow medium, in order to reduce a flow resistance during perfusion or to improve the perfusion.

WO 2004/049483 A2 discloses a fuel cell wherein a gas chamber comprises flow channels formed by ribs which initially widen in the flow direction and then narrow again.

BRIEF SUMMARY OF THE INVENTION

It is an object of the present invention to provide an electrochemical cell, for example, a galvanic cell or an electrolytic cell, in particular a fuel cell, wherein the cell, in particular a membrane-electrolyte unit of a fuel cell, can be locally perfused particularly evenly with fuel gas.

This object is achieved by means of an electrochemical cell of the aforementioned type wherein the regular grid structure is configured such that the network of flow channels has two or more flow channel directions, each of which encloses an angle relative to the main flow direction of the flow medium which differs from zero degrees. Thus with such an orientation of said flow channels, a non-parallel inflow or perfusion of the gas chamber relative to the main flow direction of the flow medium takes place.

The invention is based on recognition of the fact that an orientation of the flow channels relative to the main flow direction of the flow medium plays a significant role in the medium distribution in the gas chamber and the perfusion of the gas chamber. By varying the relative angle between the direction of the flow channels and the main flow direction of the flow medium, the perfusion of the gas chamber can be influenced or changed and improved as far as an even flow across the entire gas chamber.

If the inflow to the flow channels takes place in, or parallel to, the direction of said flow channels, i.e. if the orientation of the flow channels is parallel to the main flow direction of the flow medium, an uneven perfusion of the gas chamber arises, accompanied with a low pressure drop. Flow shadows can form in corner regions of the active area or the gas chamber.

If the orientation of said flow channels or the main flow direction is changed—and the relative angle between both differs from zero degrees, a substantially more even perfusion of the entire gas chamber is the result, which in this case is associated with a greater pressure drop. Undesirable shadow regions in the corner regions of the gas chamber can be avoided.

In particular, in this case, i.e. in the case of a non-parallel orientation, it is advantageous if the relative angle between the flow channels and the main flow direction is essentially 90 degrees, i.e. the inflow of the flow medium takes place transversely to the flow channels. Other relative angles can also be realized, for example, essentially 30 degrees, 45 degrees, 60 degrees or 75 degrees.

This effect which is taken into account by the invention is attributable to the fact that the flow medium, on impacting flow channels which are oriented non-parallel to one another—which represents a hindrance to the flow—is evenly forced outwardly, in particular by guidance of the flow medium past the protrusions forming the flow channels to input regions of the flow channels. The result is an evenly distributed (in)flow and thus an even perfusion of the active area of a cell.

In particular, also, due to the regular grid structure of the protrusions which form the (open) flow channels and the direction or directions thereof, the effect of a large-area, even flow in the gas chamber can be achieved. The grid structure is formed by a two-dimensional, regularly repeating arrangement of the protrusions so that in both spatial directions—in, for example, Cartesian or polar coordinates—a regular sequence of protrusions is provided, the spacings of which determine a geometry of the flow channels. Differently expressed, the protrusions delimit the flow channels and thus define the direction or directions thereof.

Preferably, the protrusions forming the regular grid structure are knobs which, in particular, can be symmetrically formed about a protrusion center point. The knobs can be embodied, in particular, as circular or oval.

By varying the protrusions, in particular, the cross-sections thereof, for example, in the height, width and/or form thereof, the channel volume perfused by the fuel gas can be changed. Through the formation of a flow resistance using the size of the channel volume, as disclosed, for example, by EP 1 970 985 A1, fuel gas can be steered in one flow direction.

Advantageous steering of the flow medium with regard to an even flow to the active area can also be achieved if the flow inlet has a distribution channel or is configured as a distribution channel, by means of which, an even (pre-) distribution of the flow medium or of the flow over the width is realized, for example, by means of suitable flow hindrances. A suitable channel for steering the emerging flow and, in order to make the flow even in the active area, a collecting channel can also be provided at the flow outlet.

With regard, in particular, to the even flow in the active area, it is advantageous if the distribution channel and/or the collecting channel is/are oriented parallel to a flow channel direction of the flow channels.

In particular, the use of a distribution channel and/or of a collecting channel also have the advantage that a fixed main flow direction defined across the whole cell can be realized. Whereas with otherwise changing main flow directions and a fixed defined grid structure within the cell, better but also poorer distributions of the flow can arise, an even optimum distribution can thereby be achieved over the entire cell.

In the "even distribution problem", the evenness of the flow also depends on how a pressure loss in the flow medium in the distribution channel and/or the collecting channel relates to the pressure loss of the flow medium in the active area. If the pressure loss in the distribution channel and/or collecting channel is large compared with the pressure loss in the active area, a poorer evenness of distribution is the result; if said pressure loss is small, a better evenness of distribution is the result.

Otherwise expressed, according to the invention, the resistance of the active area is increased in that—due to the direction of the flow channels in the active area differing from the main flow direction—the flow medium can no longer take a straight route from an entry side to an exit side of the active area, the distribution channel and/or the collecting channel can have a greater flow resistance—and therefore can be configured narrower without thereby worsening the evenness of the flow in the active area. A distribution channel and/or collecting channel configured to be narrow increases, in an advantageous manner, the mechanical stability of the cell.

For example, it can also be particularly advantageous to realize, by means of a regular hexagonal grid of knobs, first flow channels arranged transverse to the main flow direction (relative angle here essentially 90 degrees) as well as second and third flow channels, each at a 30 degree angle relative to the main flow direction (relative angle here essentially +30 degrees or −30 degrees relative to the main flow direction). The three channel directions of the three flow channels each include an angle of 60 degrees in this case.

Suitably, the gas chamber and the active area of the electrochemical cell therein which is to be perfused with the fuel gas are rectangular, so that the cell can be made compact. Therefore, compact fuel cells, for example, for mobile use, can be realized.

In a preferred embodiment, the flow medium is a gaseous medium, in particular a fuel gas of a galvanic cell, for example, hydrogen or oxygen. It can also be provided that the electrochemical cell is a galvanic cell, in particular a fuel cell or an electrolytic cell.

BRIEF DESCRIPTION OF THE SEVERAL VIEWS OF THE DRAWING

The invention will now be described in greater detail by reference to exemplary embodiments which are illustrated in the drawings, in which:

FIG. 5 is a schematic view of a gas chamber of a fuel cell with a view of an active area and a distribution channel and a collecting channel, according to a further exemplary embodiment and FIG. 6 is a schematic (partial) view of a gas chamber of a fuel cell with a view of an active area and a distribution channel, according to a further exemplary embodiment.

DESCRIPTION OF THE INVENTION

Figure 1:
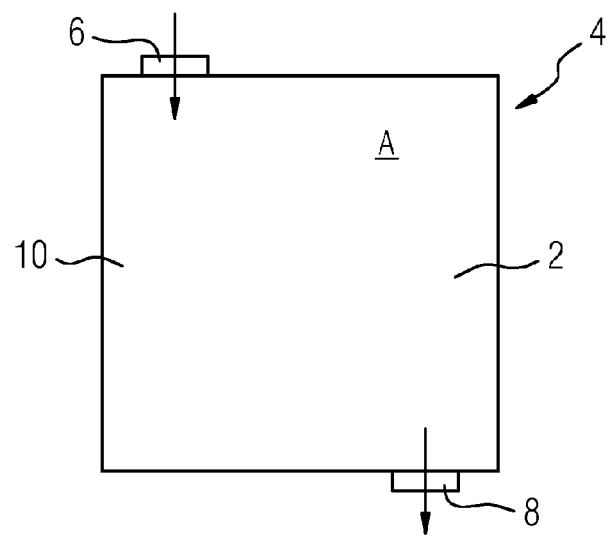
FIG. 1 is a gas chamber of a fuel cell.

FIG. 1 shows a gas chamber 2 of a fuel cell 4 in a schematic plan view.

Connected to the gas chamber 2 are a gas inlet 6 for conducting fuel gas into the gas chamber 2 and a gas outlet 8 for conducting unused fuel gas and water in the gas chamber 2 out of the gas chamber 2.

Figure 4:
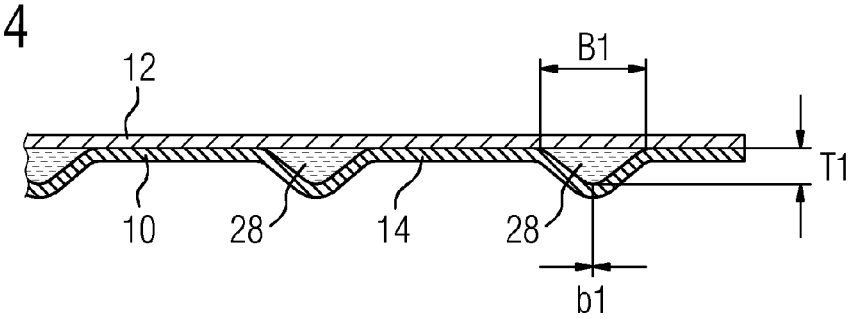
FIG. 4 is a section through plate elements with protrusions and gas channels formed therebetween.

The gas chamber 2 is delimited on the two flat sides thereof by two plate elements 10, 12, shown in FIG. 4 in a sectional representation. The plate element 10 is metallic and is part of a bipolar plate separating two fuel cells 4 from one another. The plate element 12 is an electrode, for example, an anode.

Figure 2:
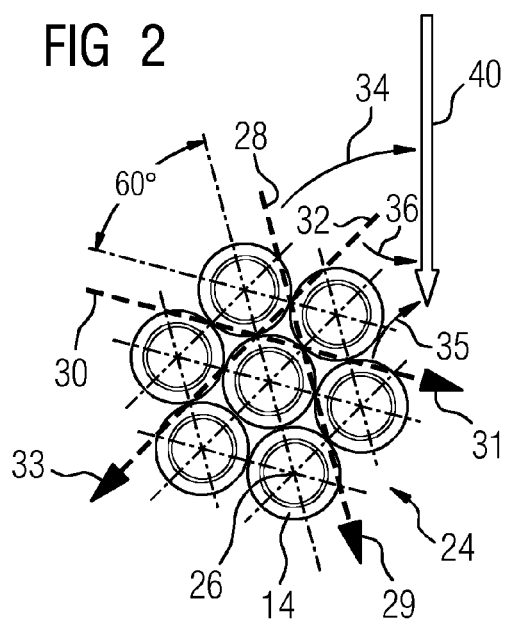
FIG. 2 is a (local) plan view of protrusions forming gas channels and the orientation of said protrusions relative to a main flow direction, according to a first exemplary embodiment.
Figure 3:
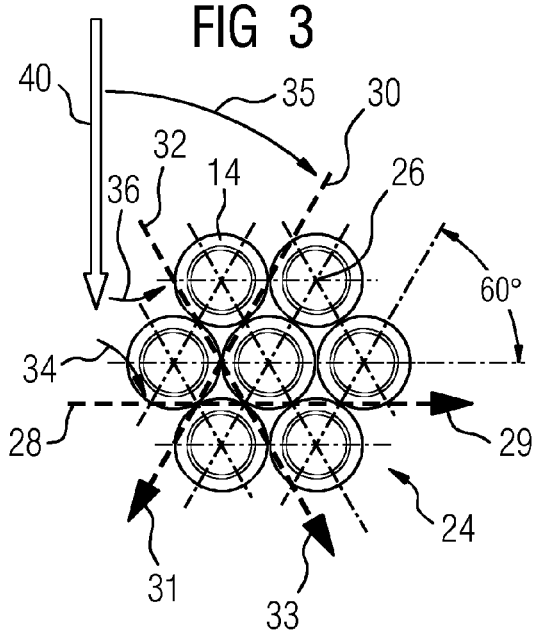
FIG. 3 is a (local) plan view of protrusions forming gas channels and the orientation of said protrusions relative to a main flow direction, according to a second exemplary embodiment.

Whereas the plate element 12 is essentially flat and without protrusions, stamped into the plate element 10 is a plurality of knob-like protrusions 14, which are illustrated in a detailed view—for a first exemplary embodiment—in FIG. 2 or—in a plan view—for a second exemplary embodiment—in FIG. 3, respectively.

FIG. 4 shows the two plate elements 10, 12 in a sectional view. The two plate elements 10, 12 rest against one another at the knob-shaped protrusions 14.

The plate element 10—and thus also the gas chamber 2—has a region A in which the protrusions 14 are arranged in a regular hexagonal grid structure 24. Center points 26 of the protrusions 14 are arranged so as to form the grid structure 24 as shown for both the exemplary embodiments in a plan view in FIG. 2 and FIG. 3. The protrusion center points 26 are the geometric central points of the circular or knob-shaped protrusions 14 symmetrically formed around said central points.

Formed between the protrusions 14 is a network of open gas channels 28, 30, 32 extending through the gas chamber 2 with the respective gas channel directions 29, 31, 33, said gas channels 28, 30, 32 connecting the gas inlet 6 to the gas outlet 8.

For clarification, the network of gas channels 28, 30, 32 is shown between the protrusions 14 and the directions thereof 29, 31, 33 in FIGS. 2, 3, 5 and 6 as a dotted line in each case or as the dotted line with the directional arrow.

Furthermore, FIGS. 2 and 3 show a main flow direction 40, which determines the direction between the gas inlet 6 and the gas outlet 8 and with which the network of gas channels 28, 30, 32 is fed with fuel gas.

As FIG. 4 shows, the volume of the gas channels 28, 30, 32 is determined by the size of the circular protrusions 14.

As FIG. 4 also shows, the gas channels 28 (also 30, 32—not shown in FIG. 4) are configured V-shaped in this case with a maximum width B1, depth T1, and a channel base width b1—in this case—of zero. Channel base widths b1 differing from zero can also be realized.

FIGS. 2 and 3 show two exemplary embodiments of the regular hexagonal grid structure 24 which are perfused by the fuel gas and which differ in the relative orientation of the flow channels 28, 30, 32 formed by the protrusions 14 with respect to the main flow direction 40.

FIG. 2 shows—in a first embodiment—the regular hexagonal grid structure 24 with the first, second and third flow channels 28, 30, 32 which are formed by the circular protrusions 14 and which each enclose an angle of 60 degrees to one another.

The orientation of the grid structure 24 in relation to the main flow direction 40 is realized according to the first embodiment of FIG. 2 in that the directions 29, 31, 33 of the flow channels 28, 30, 32 relative to the main flow direction, enclose first 34, second 35 and third angles 36 of approximately 10 degrees, 70 degrees and −50 degrees (+/− angle: clockwise/anticlockwise).

As shown, according to this first embodiment—with regard to the flow channels 28 or the channel direction 29 thereof—a non-parallel feed to the grid structure 24 with the fuel gas takes place.

FIG. 3 shows again—in a second embodiment—the regular hexagonal grid structure 24 with the first, second and third flow channels 28, 30, 32 which are formed by the circular protrusions 14 and the 60 degree intermediate angles between the channel directions 29, 31, 33.

The orientation of the grid structure 24 in relation to the main flow direction 40 is realized according to this second embodiment of FIG. 3 in that the directions 29, 31, 33 of the flow channels 28, 30, 32 relative to the main flow direction, in this case enclose first 34, second 35 and third angles 36 of approximately 90 degrees, 30 degrees and −30 degrees (+/− angle: clockwise/anticlockwise).

As is shown, according to this second embodiment—with regard to the flow channels 28 or the channel direction 29 thereof—the feed supply to the grid structure 24 with the fuel gas takes place perpendicular to said channels 28.

In the two embodiments according to FIGS. 2 and 3, relative to a parallel feed of the grid structure 24—in the sense above, "parallel" is used to mean that the first channels 28 are oriented parallel to the main flow direction 40—a more even perfusion of the active area of the cell 4 is presented by the fuel gas with, in particular, a more even supply to the corners of the gas chamber, coupled with a greater pressure drop.

This effect of an improved perfusion of the gas chamber of the cell 4 is attributable thereto that, due to the flow resistance which the protrusions 14 create on entry into the flow channels 28, 30, 32, an even distribution of the incoming flow over the width is created. The result is an evenly distributed flow and thus an even perfusion of the active area of the cell 4. Flow shadows in corner regions of the active area are thereby minimized.

This effect occurs—in direct comparison of the two embodiments of FIGS. 2 and 3—more strongly when the grid structure 24 is oriented as per FIG. 3 because in this case the greatest deviation occurs relative to a parallel channel orientation or channel perfusion. The flow resistance on entry of the fuel gas into the channels 28, 30, 32 is greatest in this case, with the result that the best distribution of the flow across the width is achieved.

FIG. 5 shows the gas chamber 2 of a fuel cell 4 in a schematic plan view of the plate element 10 according to a further embodiment.

The plate element 10—and thus also the gas chamber 2—has a regular hexagonal grid structure 24 of protrusions 14 according to the representation of FIG. 3 which form the network of gas channels 28, 30, 32, respectively with the gas channel directions 29, 31 and 33.

Arranged at the inlet side region 3 or the inflow side 3 of the gas chamber 2 is a distribution channel 7 which—after entry of the flow medium via the gas inlet (6, not shown)—favors an even distribution of the flow medium across the whole width of the gas chamber 2.

Further favoring the even distribution of the flow medium, a collecting channel 9 is arranged at the outlet side region 5 or the outflow side 5 of the gas chamber 2, via which the flow medium is conducted out after flowing through the grid structure 24, collected via the gas outlet (8, not shown).

The arrangement of the distribution channel 7 on the inlet side 3 and of the collecting channel 9 on the outlet side 5 furthermore enables the grid structure 24 to be fed with the same main flow direction 40 across the entire width of the gas chamber 2. The same favorable flow conditions over the whole cell 4 for a fixed grid structure 24 can therefore be realized.

After distribution of the flow medium in the distribution channel 7 and feeding of the flow medium to the grid structure 24 with the main flow direction 40, the flow medium perfuses the network of gas channels 28, 30, 32 of the grid structure 24.

The represented configuration of the gas channels 28, 30 and 32 with a channel direction 29 parallel to the inlet side 3 and to the outlet side 5 enables even perfusion of the active area of the cell 4, in particular, with a more even feed to the corners of the gas chamber 2—coupled with a greater pressure drop.

As a result, the distribution channel 7 and the collecting channel 9 can have a greater flow resistance—and can thus be configured narrower without thereby impairing the evenness of the flow in the active area. The narrower configuration of the distribution channel 7 and the collecting channel 9 increases the mechanical stability of the cell 4.

FIG. 6 shows a section of the gas chamber 2 according to a further embodiment of a fuel cell 4 in a schematic (partial) plan view of the plate element 10.

The plate element 10—and thus the gas chamber 2—has a regular grid structure 24 of protrusions 14 which form the network of gas channels 28, 30, 32, respectively with the gas channel directions 29, 31 and 33. The protrusions 14 according to said embodiment of FIG. 6 differ from the protrusions 14 according to FIG. 5 or FIG. 3 only in that said protrusions are configured oval shaped.

Here also—as shown in FIG. 6—arranged at the inlet side region 3 or the inflow side 3 of the gas chamber 2 is a distribution channel 7 which—after entry of the flow medium via the gas inlet (6, not shown)—favors an even distribution of the flow medium across the whole width of the gas chamber 2. Further favoring the even distribution of the flow medium is a collecting channel 9 (not shown), here also arranged at the outlet side region 5 or the outflow side 5 of the gas chamber 2, via which the flow medium is conducted out after flowing through the grid structure 24, collected via the gas outlet (8, not shown).

After distribution of the flow medium in the distribution channel 7 and feeding of the flow medium to the grid structure 24 with the main flow direction 40, as FIG. 6 shows, the flow medium perfuses the network of gas channels 28, 30, 32 of the grid structure 24.

Here also—as FIG. 6 shows—the configuration of the gas channels 28, 30 and 32 is such that the channel direction 29 is oriented parallel to the inlet side 3 and (not shown) parallel to the outlet side 5, which enables even perfusion of the active area of the cell 4, in particular, with a more even feed to the corners of the gas chamber 2—coupled with a greater pressure drop.

As a result, as shown in FIG. 6, the distribution channel 7 and the collecting channel 9 can have a greater flow resistance—and can thus be configured narrower without thereby impairing the evenness of the flow in the active area. The narrower configuration of the distribution channel 7 and the collecting channel 9 increases the mechanical stability of the cell 4.

The invention claimed is:

1. An electrochemical cell, comprising:

two plate elements, one of said plate elements having protrusions disposed in a regular grid structure and configured to support said one plate element on the other plate element;

a flow chamber disposed between said two plate elements and having a flow inlet with a distribution channel and a flow outlet with a collecting channel for a flow medium permeating said flow chamber;

said flow inlet and said flow outlet defining a main flow direction of the flow medium;

a network of flow channels disposed between said protrusions and passing through said flow chamber, said flow channels extending in two or more flow channel directions;

each of said two or more flow channel directions enclosing an angle other than zero degrees relative to said main flow direction of the flow medium and one of said two or more flow channel directions enclosing an angle of substantially 30 degrees or of substantially 60 degrees relative to said main flow direction of the flow medium; and said distribution channel and said collection channel each being oriented parallel to a flow channel direction of said flow channels.

2. The electrochemical cell according to claim 1, wherein said protrusions in said regular grid structure are knobs each being symmetrically formed about a respective protrusion center point.

3. The electrochemical cell according to claim 2, wherein said knobs are substantially circular or oval.

4. The electrochemical cell according to claim 1, wherein the flow medium is a fuel gas of a galvanic cell.

5. The electrochemical cell according to claim 1, wherein the electrochemical cell is a galvanic cell or an electrolytic cell.

* * * * *